United States Patent [19]
Driggs

[11] Patent Number: 5,461,975
[45] Date of Patent: Oct. 31, 1995

[54] LOW FRICTION BALER LINER

[76] Inventor: Leland W. Driggs, 2547 Burma Rd., Eureka, Mont. 59917-9431

[21] Appl. No.: 260,780

[22] Filed: Jun. 16, 1994

[51] Int. Cl.$^6$ .............................. B30B 15/32; B30B 9/30
[52] U.S. Cl. .................... 100/188 R; 100/191; 100/245
[58] Field of Search ................................. 100/18, 19 R, 100/179, 188 R, 191, 192, 220, 245

[56] References Cited

U.S. PATENT DOCUMENTS

| | | | |
|---|---|---|---|
| Re, 9,956 | 12/1881 | Dederick | 100/192 |
| 219,718 | 9/1879 | Groom | 100/192 |
| 372,636 | 11/1887 | Nixon | 100/191 |
| 675,258 | 5/1901 | Whitman | 100/192 |
| 728,516 | 5/1903 | Trabue et al. | 100/191 |
| 751,752 | 2/1904 | Pilliod | 100/191 |
| 854,465 | 5/1907 | Christensen | 100/191 |
| 1,218,175 | 3/1917 | Faint | 100/192 |
| 1,830,623 | 11/1931 | Rollman | 100/191 |
| 1,857,373 | 5/1932 | Goggins | 100/189 |
| 3,424,081 | 1/1969 | Hoke | 100/192 |
| 3,487,774 | 1/1970 | Duerksen | 100/189 |
| 3,518,937 | 7/1970 | Westerman | 100/192 |
| 4,280,403 | 7/1981 | Alderson | 100/43 |
| 4,354,430 | 10/1982 | Horiuchi | 100/192 |
| 4,565,123 | 1/1986 | Sanders | 100/43 |
| 4,788,901 | 12/1988 | Klinner et al. | 100/188 |
| 4,791,865 | 12/1988 | Naaktgeboren | 100/188 |
| 4,924,667 | 5/1990 | Wondergem et al. | 100/188 |
| 4,936,206 | 6/1990 | Miles et al. | 100/188 R |
| 5,123,338 | 6/1992 | Mathis | 100/43 |
| 5,193,449 | 3/1993 | Ransom | 100/187 |
| 5,215,007 | 6/1993 | Sebright et al. | 100/45 |

OTHER PUBLICATIONS

Ford New Holland, Inc. brochure, "New Holland 14×18 Square Balers and Bale Throwers," 1991.

*Primary Examiner*—Stephen F. Gerrity
*Attorney, Agent, or Firm*—Wells, St. John, Roberts, Gregory & Matkin

[57] ABSTRACT

A low friction liner is described for mounting to an agricultural material baler within the discharge chute for the baled materials. The liner includes liner plates of low friction material that are attached by a mount to the inwardly facing surfaces of the baler discharge chute. The low friction material provides inwardly facing low friction wear surfaces used to engage and guide materials along the discharge chute to a open discharge end. In one preferred embodiment, the low friction surfaces are flat and continuous from forward to rearward ends of the discharge chute plates. In another preferred form, angular indentations are made within the liner with incised or indented shoulders facing the rearward ends of the discharge chute plates to provide abutment surfaces for avoidance of "spring back" of baled materials as they are moved toward the discharge end.

15 Claims, 4 Drawing Sheets

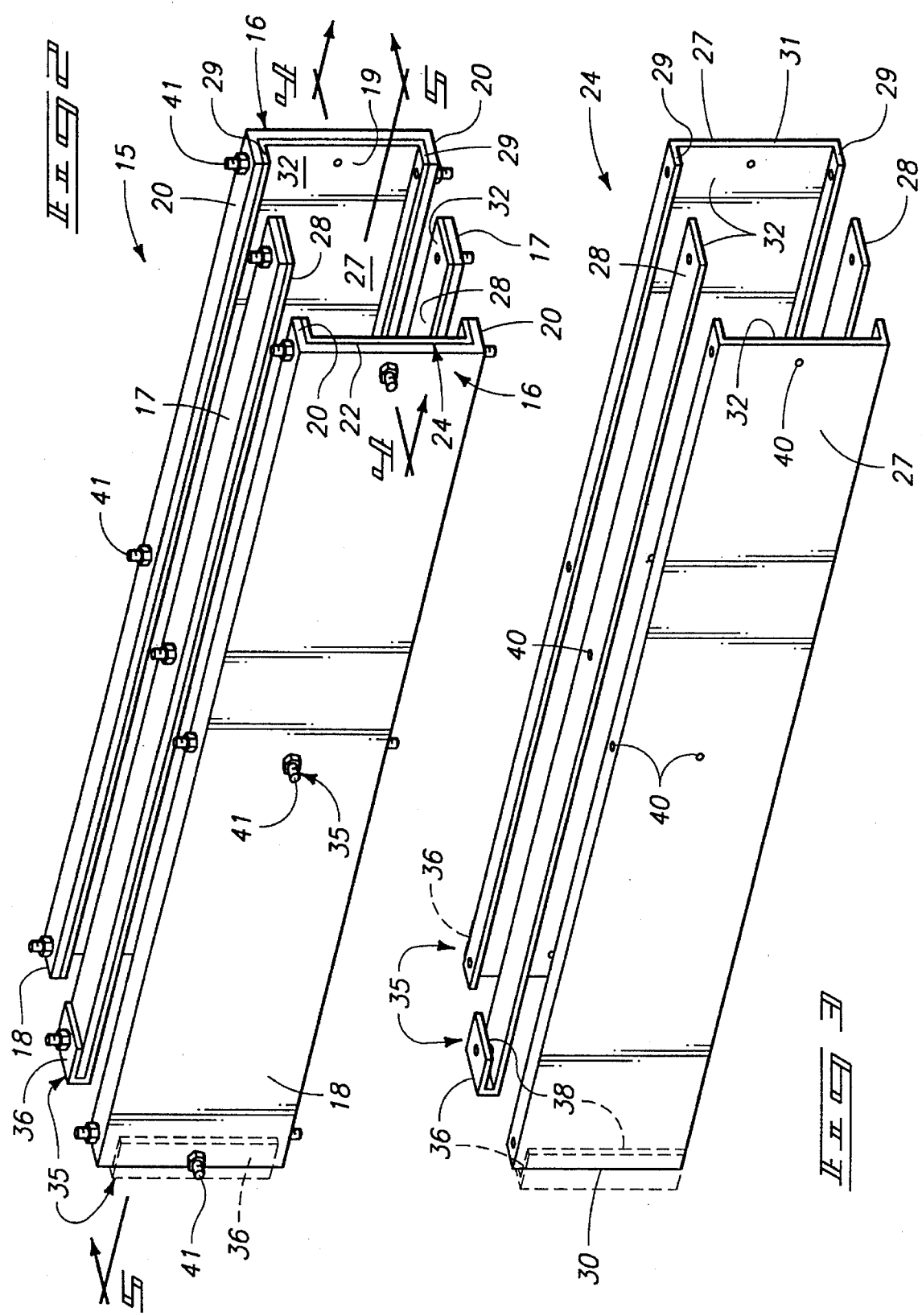

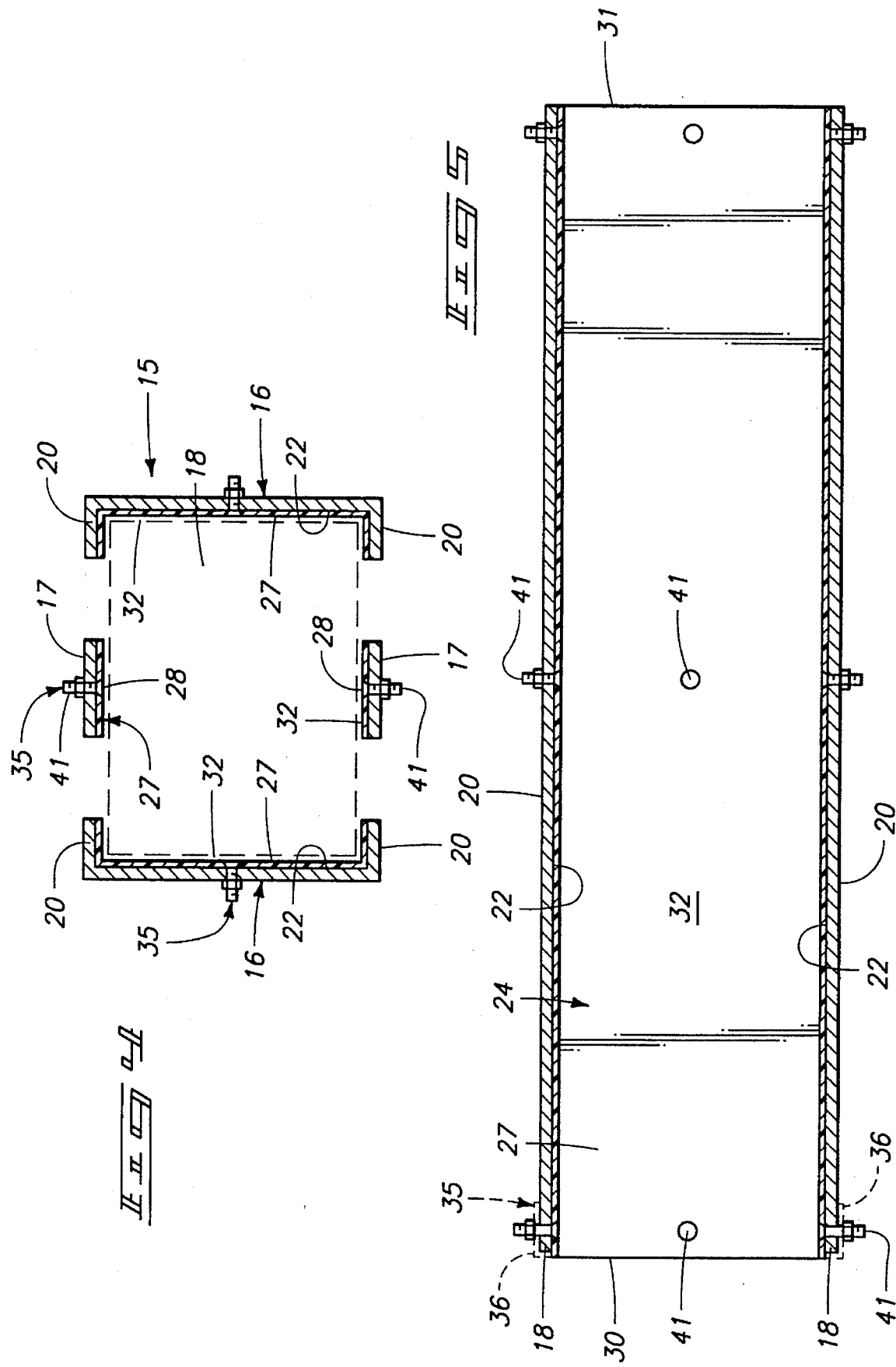

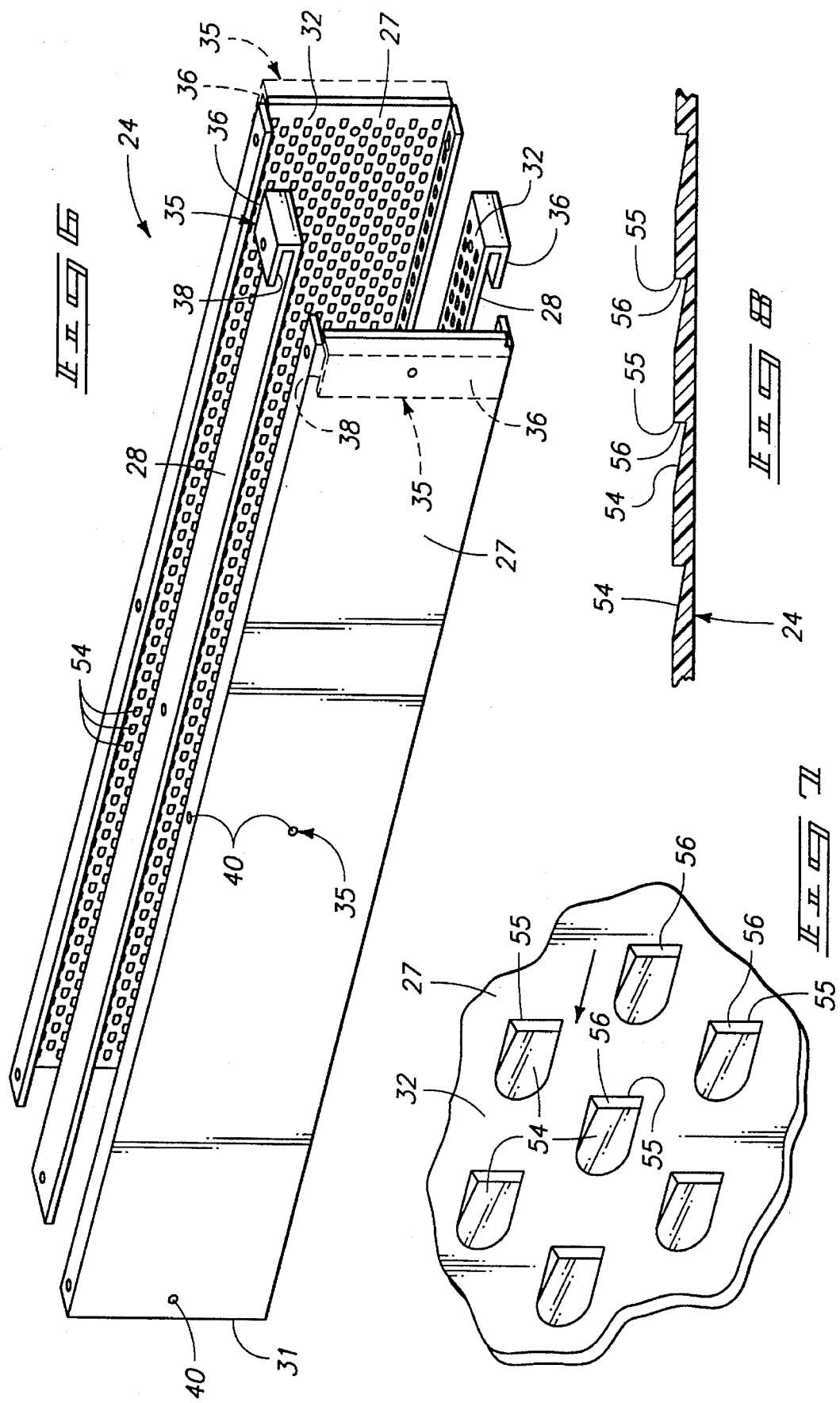

LOW FRICTION BALER LINER

TECHNICAL FIELD

The present invention relates to extrusion of baled material from tractor pulled or self powered agricultural material balers, and more particularly to reduction of friction within the bale discharge chutes of such balers.

BACKGROUND OF THE INVENTION

The typical agricultural material baler makes use of a mechanical compaction chamber and a metal discharge chute for forming and discharging cut vegetation in compressed bales. The bales are typically discharged directly in the field from which the material has been cut, or are deposited through the chute directly to a stacking mechanism.

Resistance to movement through the chute is influenced by the condition of the material being baled and the chute walls. Rusted chute wall surfaces increase friction and adversely affect baler performance. Moisture on the chute surfaces also adds inconsistency to frictional resistance, as does moisture in the materials being baled. Fluctuations in outside air temperature further influence frictional resistance to crop movement along the chute walls. Such inconsistencies are undesirable, and result in equally undesirable, inconsistent bales.

Other factors also influence baler performance. For example, a wet crop will bale differently in the same baler than the same crop when dry. Likewise, a dusty crop will bale differently than a clean crop. Weeds or other foreign materials in the crop also affect baler performance. Such crop inconsistencies and still other variables, such as tractor speed, terrain, and windrow consistency all affect baler performance by producing differing drag characteristics through the baler compression chamber and chute.

Inconsistent friction in baler discharge chutes can cause operational power requirements to grow, increase downtime, reduce the useful life of the baler, and reduce fuel efficiency. Further, it is difficult and time consuming to pick up and stack inconsistent bales, even if they retain their structural integrity to some degree.

It is of interest to note that many baler manufacturers, while providing balers with adjustments for bale length, string or wire tension, and compaction, have failed to recognize the need to lower, consistent friction along the walls of the compaction chamber and discharge chutes. Adjustments are provided in a variety of ways to enable adjustment of compression by selectively adjusting the space between discharge chute walls, but no provision has been made to lower frictional resistance along such walls. A need has thus remained for baler chutes with consistently low friction discharge chute walls.

BRIEF DESCRIPTION OF THE DRAWINGS

Preferred forms of the present invention are illustrated in the accompanying drawings in which:

FIG. 2 is a perspective view of a baler discharge chute with the present low friction liner plates attached thereto;

FIG. 3 is a perspective view of a first form of the present low friction baler chute plate liner;

FIG. 4 is an enlarged cross-sectional view taken substantially along line 4—4 in FIG. 2;

FIG. 5 is a longitudinal sectional view taken substantially along lines 5—5 in FIG. 2;

FIG. 6 is a perspective view showing indentations along the liner plates;

FIG. 7 is an enlarged fragmented view of an indented liner plate; and

FIG. 8 is a fragmented enlarged sectional view showing the indentations.

DETAILED DESCRIPTION OF THE PREFERRED EMBODIMENTS

Figure 1:
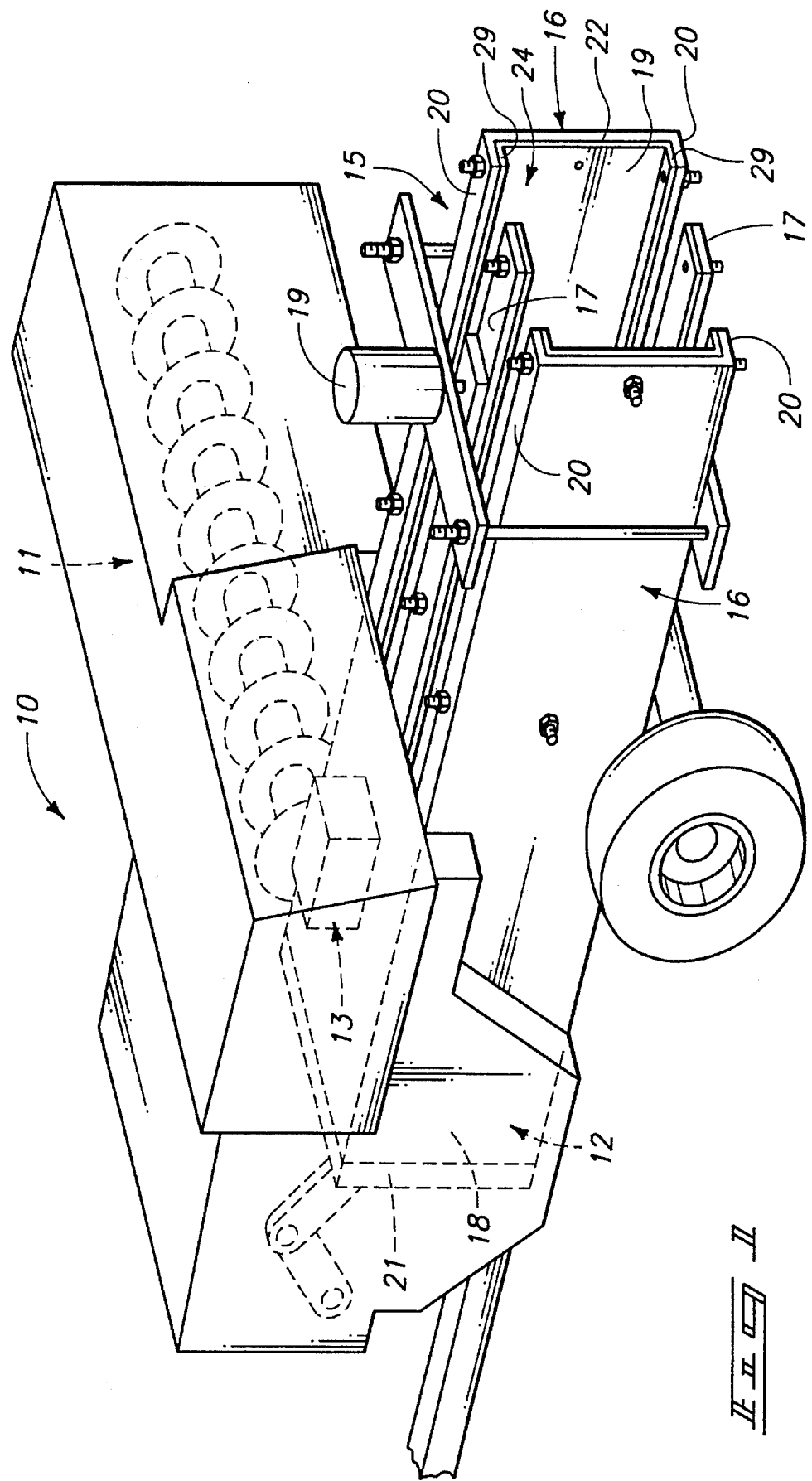
FIG. 1 is a diagrammatic view of the baler incorporating a first preferred form of the present invention.

This disclosure of the invention is submitted in furtherance of the constitutional purposes of the U.S. Patent Laws "to promote the progress of science and useful arts" (Article 1, Section 8).

A baler incorporating features of a first preferred form of the present invention is generally designated in FIG. 1 by the reference character 10. The baler 10 may be of a standard variety known in the marketplace for receiving cut vegetation along an infeed 11 and delivering the cut vegetation to a compression chamber 12 at which the vegetation is mechanically compressed and extruded in a rearward direction past a tying mechanism generally shown in the area of 13 through an elongated rearwardly open discharge chute 15.

The baler generally described above will not be described in greater detail herein as such balers are well known in the agricultural industry. However, to support further description, greater details of the discharge chute 15 will be discussed.

The discharge chute 15 is a conventional part of a typical baler 10. It includes elongated discharge chute side plates 16 and discharge chute top and bottom plates 17. The chute plates 16 and 17 define a elongated rectangular opening 18 as shown in FIG. 4 along which rectangular bales are forced in a rearward direction toward a open rearward discharge end 19.

The baler discharge chute plates 16, 17 extend from inward or forward ends 18 located within the baler mechanism. The forward ends, in fact, extend into the compression chamber 12 to slidably receive a typical reciprocating compressing piston graphically illustrated at 21 in FIG. 1.

Details of the individual discharge chute side and top chute plates 16, 17 are shown in FIG. 2. The top and bottom chute plates 17 are substantially parallel and rectangular. They may be mounted to the baler and connected to a manual or fluid powered compression device 19 that is selectively adjustable to vary the space between their bale engaging surfaces in order to affect compression of the materials within the bales.

The side chute plates 16 (as shown in FIGS. 2 and 4) are upright and parallel to one another. They include upper and lower flanges 20 that project inwardly toward the top and bottom chute plates 17. Vertical spacing between the flanges 20 of each side chute plate 16 is substantially equal to the spacing between the top and bottom chute plates 17. The rectangular opening 18 is thus defined as shown in FIG. 4 by the inwardly facing crop engaging surfaces 22 of the chute cross-sectional configuration of the baled material.

Various compaction devices may be provided along the length of the side chute plates 16 as are known in the art. However, it is more typical that the side chute plates remain substantially stationary.

The discharge chute plates 16, 17 are typically constructed of sheet steel and are thus susceptible to environmental factors such as temperature and humidity. Both factors affect the frictional resistance along the inwardly facing surfaces 22 of the chute plates. This effect is potentially amplified by formation of rust along the wear surfaces 22.

The present invention includes a low friction liner 24 that is mountable to the discharge chute 15 to minimize friction along the wear surfaces 22 and to render inevitable frictional resistance substantially constant regardless of temperature or humidity. By providing a low frictional resistance that is constant through various typical temperature and humidity conditions, distinct operating advantages are gained and consistent, uniform bales result.

The low friction liner 24 is comprised of a low friction wear liner plate for each of the baler discharge chute plates 16, 17. The liner 24 therefore includes a pair of side liner plates 27 that are complementary to the chute discharge side plates 16. The liner also includes top and bottom liner plates 28 that complement the top and bottom discharge chute plates 17.

The individual liner plates 27, 28 extend from inward leading edges 30 rearwardly to trailing edges 31. These edges are advantageously coincidental with the forward and rearward ends 18, 19 of the discharge chute downstream of the compressor piston 21. Each liner plate includes an inwardly facing low friction wear surface 32.

The liner plates 27, 28 are selected from a low friction material such as high molecular weight polyethylene (HMW), ultra high molecular weight (UHMW) polyethylene, NYLATRON™, TEFLON™, or other low coefficient of friction synthetic resins or polymers. In a first preferred form, UHMW polyethylene is desired for its low coefficient of friction, resistance to wear, temperature changes and moisture.

It is also preferred that the liner plates be formed of a relatively thin material. It has been found that approximately ⅛th inch thick sheet material is preferable to minimize the overall reduction of the cross-sectional area of the baler chute opening due to liner plate wall thickness. Thickness dimensions may vary slightly with the material used. However, ½ inch wall thickness is an approximate maximum desired dimension in order to minimize the overall reduction in the bale discharge chute dimensions caused by the present liner plates.

As shown in FIGS. 1, 2, and 3, the liner plates 27, 28 are formed to mate with corresponding inwardly facing surfaces of the discharge chute 15. Thus, the side plates 27 are provided with top and bottom flanges 29 that match similar flanges on the discharge chute side plates 16. The top and bottom plates 28 are sized to fit the top and bottom discharge chute plates 17.

A mount 35 is generally shown for securing the liner plates in flush engagement with the inward facing surfaces 22 of the discharge chute 15. A preferred mount is illustrated in FIGS. 2 and 3. Here the mount 35 is shown to include integral brackets 36 at the forward liner plate ends.

The brackets 36 are C-shaped and integral with the leading edges of the liner plates. The brackets 36 are shaped with rearwardly facing open ends 38 to slide over and receive the forward ends 18 of the discharge chute plates. This provides the advantage of securely connecting the plates to the discharge chute and covering the otherwise exposed joint between the liner plates and discharge chute plates at the forward ends. With this arrangement there is no possibility for baled material to become wedged between the liner plates and discharge chute plates during baling operations. The brackets 36 also mount the liner plates to resist rearward motion along with the baled materials.

The brackets 36 on the side liner plates are optional, depending on the type of baler on which the liner is to be mounted. In such situations, the mount may simply comprise the fastener arrangements shown and described below.

Mount 35 advantageously includes fastener receiving apertures 40 formed through the liner plates to receive fasteners 41. A preferred form of fastener 41 is a headed machine screw or carriage bolt and nut combination. Carriage bolts are preferred with thinner liner materials where countersinking is undesirable. The smooth rounded heads will stand proud of the low friction liner plate surfaces, and will not add significant frictional resistance to passage of the bales.

If flat headed machine screws are used, the liner plates are provided with counter sink indentations so the headed ends may be fitted to the associated liner plates with the flat end surfaces of the screw heads flush or slightly recessed in relation to the low friction wear surfaces 32 of the liner plates. Thus, fasteners are selected with headed ends that will not present obstruction to passage of the baled material.

Holes may be drilled in the baler discharge chute 15 to align with the fastener receiving apertures 40. Alternately, the holes may be simultaneously drilled through the discharge chute and low friction liner plates during mounting to assure hole alignment as the liner 24 is installed. This procedure may simply involve connecting the low friction liner plates 27, 28 in position with the brackets 36 received over the forward ends 18 of the discharge chute plates. Conventional clamps may then be used to temporarily secure the low friction liner plates in position while holes are drilled through the discharge chute plates to receive fasteners. The fasteners 41 are then secured to hold the liner plates firmly in position.

It is pointed out that other types of "fasteners" may also be used in addition to or in place of the fasteners exemplified above. For example "fasteners" should be understood to include rivets, spot welded washers, or appropriate adhesives that might also be used to secure the liner plates to the metal surfaces of the baler discharge chute.

An alternate form of liner 24 is shown in FIGS. 6–8. This form includes multiple angular indentations 54 formed into the liner plates. The indentations form edges 55 with shoulders 56 that face rearwardly and are on a plane substantially normal to the low friction wear surfaces 32 and to the length of the liner plates. The shoulders 56 provide abutment surfaces for engaging and preventing "spring back" of materials moving rearwardly along the baler discharge chute in the direction indicated by the arrow in FIG. 7.

It is pointed out that the low friction wear surfaces 32 are provided with "indentations" as opposed to projections that would extend outwardly into the path of baled materials. The indentations 54 being formed into the liner plate surfaces do not obstruct or prevent rearward movement of the baled materials. Yet the indentations have a positive effect in preventing undesired backward motion of materials within the chute. Projections, as used in prior baling chutes have the advantage of preventing "spring back" but also have a negative effect in that they present obstacles in the rearward path of the baled materials and therefore increase the friction along the length of the chute.

Experimentation has been conducted using strips of ultra high molecular weight (UHMW) polyethylene bolted to the inward facing surfaces of a baler discharge chute. The results were surprising in that significant differences were noted when comparing use of the baler without installed liner plates to results after the liner plates were installed. A definite increase in bale uniformity (weight, length, density) was experienced using the liner. The amount of dust produced during the baling operation was notably reduced, as was the amount of leaf loss on the baled materials. It was also found that the baling operation required lower horsepower and less fuel consumption while baling speed was increased. Knotter problems were reduced with attendant reduction in baler down time. It was further found that the baler ran much more quietly. Further, the low friction liner plates enabled use of the baler with higher moisture content materials.

The above advantages are attributed to the low friction liner and placement of the low friction material to reduce the friction inside the chute. Such low friction is maintained at a relative constant. This is a distinct advantage over the typical steel bale discharge chute in which surface friction is erratic and apt to change with different temperature and moisture content within baled materials.

It is pointed out that the low friction material is not intended to reduce tension or compression of materials within the chute, but simply to reduce and make constant the coefficient of friction along the chute walls. Thus, the compression and tension adjustments are allowed to remain as selected.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A low friction baler chute plate liner for an agricultural material baler having a bale compression chamber and a discharge chute comprised of chute plates leading from forward ends to rearward free ends, comprising:

a liner plate of low friction material for each baler chute plate;

wherein each of said liner plates includes a leading edge and a trailing edge, and a low friction wear surface between said forward and trailing edges;

a mount on the liner plate for securing the liner plate to the baler chute plate with the leading edge adjacent the forward chute plate end; and wherein the mount is comprised of a bracket on the liner plate at the leading edge thereof for receiving the forward end of the baler chute plate.

2. A low friction baler chute plate liner as claimed by claim 1, wherein the bracket is "C" shaped and is situated on the liner plate at the leading edge thereof with the open portion of the "C" configuration facing the trailing edge of the liner plate for receiving the forward end of the baler chute plate.

3. A low friction baler chute plate liner as claimed by claim 1, further comprising indentations formed within the liner plate along the low friction wear surface thereof.

4. A low friction baler chute plate liner as claimed by claim 1, wherein the liner plate is elongated between the leading and trailing edges and further comprising indentations formed within the liner plate along the low friction wear surface thereof, said indentations including edge surfaces oriented substantially normal to the length of the liner plate and to the wear surface.

5. A low friction baler chute plate liner as claimed by claim 1, wherein the mount includes fastener receiving apertures formed through the liner plate along the low friction wear surface.

6. A low friction baler chute plate liner as claimed by claim 1 wherein the liner plate is formed of ultra high molecular weight polyethylene plastic.

7. A low friction baler chute plate liner as claimed by claim 1 wherein the liner plate is formed of ultra high molecular weight polyethylene plastic having a thickness dimension of approximately ⅛th inch.

8. An agricultural material baler, comprising:

a frame;

a bale compressor and tying device on the frame;

a discharge chute including chute plates leading from forward ends communicating with the bale compressor and tying device to rearward free ends;

a liner plate of low friction material for each baler chute plate;

wherein each of said liner plates includes a leading edge and a trailing edge, and a low friction wear surface between said forward and trailing edges; and a mount on the liner plate for securing the liner plate to the baler chute plate with the leading edge adjacent the forward chute plate end; and indentations formed within the liner plate along the low friction wear surface thereof.

9. The baler as claimed by claim 8, wherein the mount is comprised of an integral "C" shaped bracket on the liner plate at the leading edge thereof with the open portion of the "C" configuration facing the trailing edge of the liner plate for receiving the forward end of the baler chute plate.

10. The baler as claimed by claim 8, wherein the mount is comprised of an integral bracket on the liner plate at the leading edge thereof for receiving the forward end of the baler chute plate.

11. The baler as claimed by claim 8, wherein the liner plate is elongated between the leading and trailing edges and wherein said indentations include edge surfaces oriented substantially normal to the length of the liner plate and to the wear surface.

12. The baler as claimed by claim 8, wherein the mount includes fastener receiving apertures formed through the liner plate along the low friction wear surface.

13. The baler as claimed by claim 8, wherein the mount includes fastener receiving apertures formed through the liner plate along the low friction wear surface; and an integral bracket on the liner plate at the leading edge thereof for receiving the forward end of the baler chute plate.

14. The baler as claimed by claim 8 wherein the liner plate is formed of ultra high molecular weight polyethylene plastic.

15. The baler as claimed by claim 8 wherein the liner plate is formed of ultra high molecular weight polyethylene plastic having a maximum thickness dimension of approximately ½ inch.

* * * * *